Sept. 4, 1934.  A. D. ROBBINS  1,972,602
CLUTCH
Filed June 21, 1932   2 Sheets-Sheet 1

INVENTOR
Azor D. Robbins,
BY Redding, Greeley, O'Shea & Campbell
HIS ATTORNEYS

Sept. 4, 1934.  A. D. ROBBINS  1,972,602
CLUTCH
Filed June 21, 1932  2 Sheets-Sheet 2

INVENTOR
Azor D. Robbins,
BY Redding, Greeley, O'Shea & Campbell
HIS ATTORNEYS

Patented Sept. 4, 1934

1,972,602

UNITED STATES PATENT OFFICE 1,972,602

CLUTCH

Azor D. Robbins, Highland Park, N. J., assignor to International Motor Company, New York, N. Y., a corporation of Delaware Application June 21, 1932, Serial No. 618,435

7 Claims. (Cl. 192—58)

The present invention relates to gear transmitting mechanisms and embodies, more specifically, a mechanism of the fluid type for transmitting power from a driving to a driven element.

More particularly, the invention embodies a combined clutch and a torque converter for affording a variable supply of torque from a driving to a driven member during acceleration of the latter. In order that the torque of an engine may be stepped up during the starting and accelerating period when the engine is driving a vehicle, the present invention has been designed and it is proposed to provide a mechanism which, after a predetermined acceleration, affords a direct drive from the driving to the driven member without any change in torque supplied to the latter.

An object of the invention, accordingly, is to provide a power transmitting mechanism by means of which the torque supplied from a driving to a driven member may be stepped up during predetermined periods of operation.

A further object of the invention is to provide a power transmitting mechanism wherein a fluid is utilized to transmit the torque from a driving to a driven member, the construction being such as to enable the relative speed of rotation between the driving and driven members to control the torque supplied therebetween.

A further object of the invention is to provide a simple fluid transmitting mechanism for supplying power between a driving and a driven member, means being incorporated therein for varying the torque transmitted.

A further object of the invention is to provide an effective means for controlling the torque transmitted by fluid power transmitting mechanism whereby varying degrees of torque may be provided from a maximum value to a value representing the direct drive between the driving and driven members.

Further objects, not specifically enumerated above, will be apparent as the invention is described in greater detail in connection with the accompanying drawings, wherein.

Figure 2:
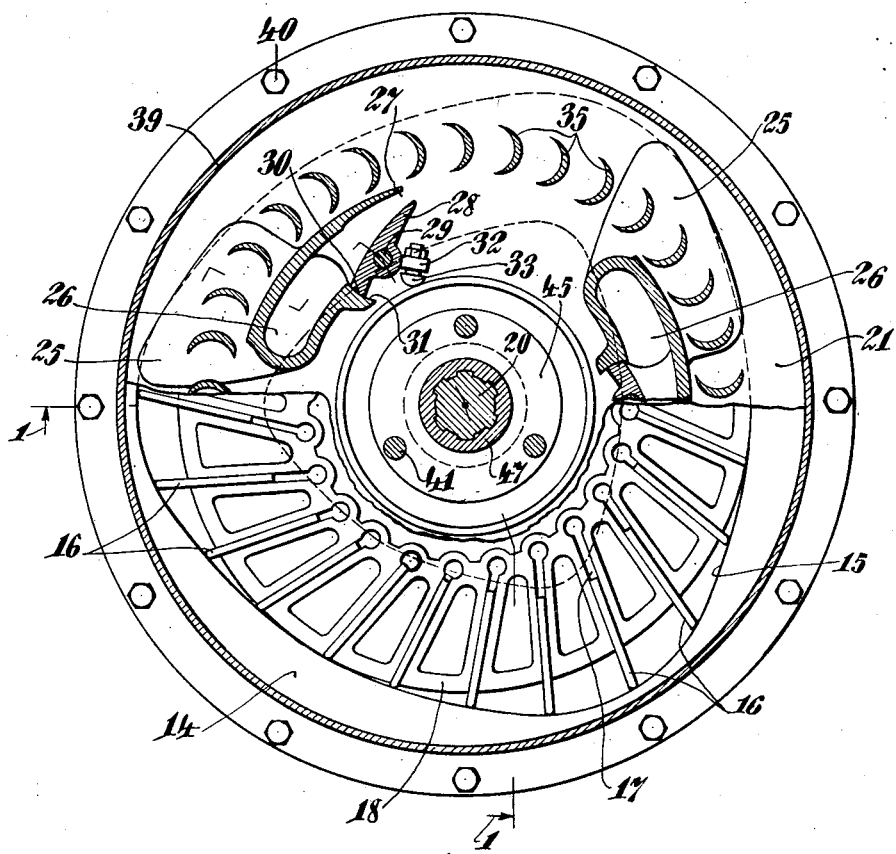
Figure 2 is a view in section, taken on a broken plane indicated by the line 2—2 of Figure 1, and looking in the direction of the arrows.

With reference to the above drawings, a driving shaft is indicated at 10, power being supplied to this shaft from any suitable source. The shaft is formed with a disc 11 to which a flywheel 12 is secured by means of bolts 13. The flywheel is formed with an annular inertia member 14, the interior periphery of which is formed in the shape of a 3 lobed cam 15, as seen in Figure 2. This surface receives vanes 16 which are normally urged thereagainst by means of the inertia of the vanes due to rotation. The vanes are mounted in slots 17 which are formed in a pump member 18, the pump member being secured to a hub 19 which is splined to a driven shaft 20. A pump casing 21 is secured to the inertia member 14 and forms a chamber with the disc member 12 and the inertia member 14. The chamber is of such size that the vanes are received snugly therein whereby leakage around the vanes is reduced to a minimum.

The end of driven shaft 20 is preferably journaled at 22 in the flywheel disc 12 and casing 21 is formed with an annular central aperture 23 in which a sleeve 24 is slidably received. The pump member 18 thus works in a pump chamber which is completely closed except at ports 24 which are formed in the casing 21. These ports are preferably three in number and are formed in projecting members 25 which are formed or secured to the pump casing. Each member 25 is formed with a duct 26 which communicates with the respective ports 24 and the ducts 26 terminate in exhaust nozzles 27.

Figure 1:
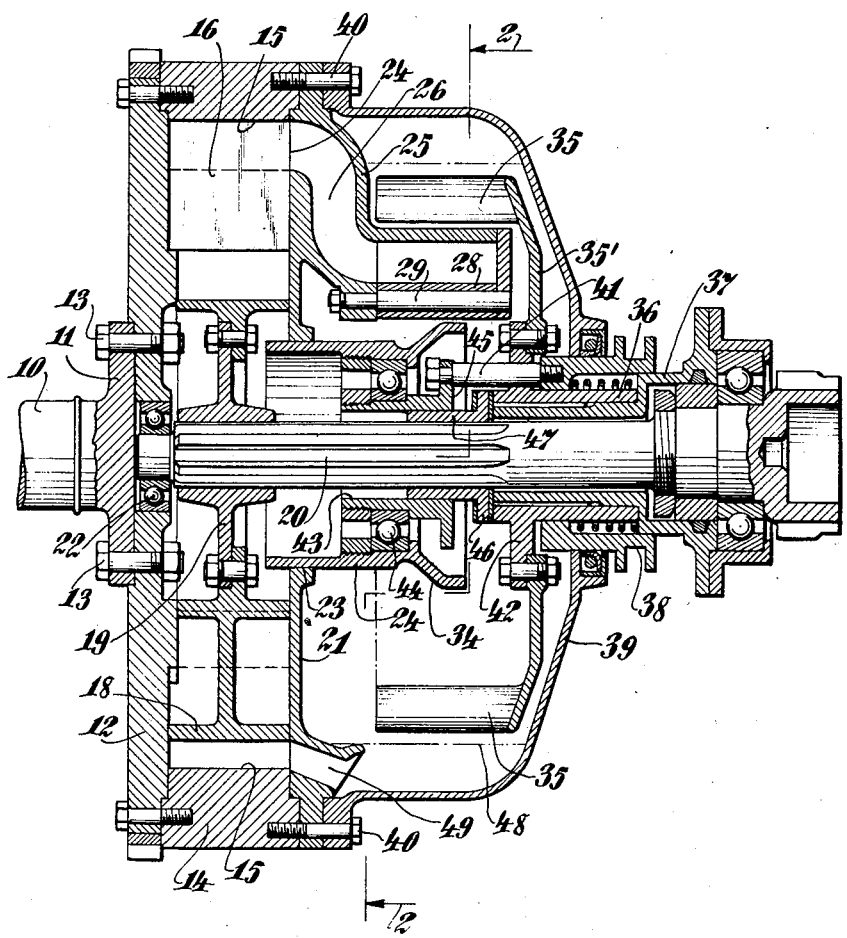
Figure 1 is a view in section, taken on a broken plane indicated by the line 1—1 of Figure 2, and looking in the direction of the arrows.

The nozzles 27 are provided with an adjustable lip 28 which may be journaled at 29 and the lip is formed with a curved extremity 30 to cooperate with a curved surface 31, formed on the member 25. An arm 32 is formed on each lip 28 and may be provided with a foot 33 which is adapted to be engaged by a sloping annular cam face 34 which is formed upon sleeve 24. As the sleeve 24 is advanced axially to the left, as viewed in Figure 1, the sloping cam face 34 engages the feet 33 and the nozzle 27 is restricted in accordance with the degree of movement of the sleeve 24.

A plurality of stationary vanes 35 are mounted upon a disc 35' which is secured to a sleeve 36, splined to a sleeve 37 which is supported upon a stationary part of the mechanism. Vanes 35 are formed as indicated in Figure 2 and are spaced in the plane of the nozzles 27.

Adjustment of the sleeve 24 is effected by means of a collar 38 which is slidably mounted in a cover 39, secured to the casing 21 and inertia member 14 by means of bolts 40. Guides 41 are secured to the hub of collar 38 and project through a disc 42 which is formed upon sleeve 36 and upon which disc 35' is mounted. The guides 41 are secured to a sleeve 43 upon which sleeve 34 is rotatably mounted by means of a bearing 44.

Sleeve 43 is formed with a friction surface 45 which is adapted to engage a friction member 46 which abuts against the sleeves 36 and 37. When sleeve 24 is fully retracted, the friction member 45 engages the member 46 and the rotation of driven shaft 20 is thus retarded. It will be seen that member 46 is mounted upon a sleeve 47 which is splined to the driven member 20.

In operation, relative rotation between the driving and driven member causes the vanes 16 to pump a fluid within the pump chamber through the ports 24 and ducts 26, the fluid being discharged from nozzles 27 and engaging the vanes 35. The direction of motion of the fluid is reversed and the reaction upon the nozzles and pump member 18 is transmitted to the driven member 20. As the nozzles 27 are restricted the reaction becomes greater and a direct drive condition is approached. When the nozzles are closed entirely no relative rotation between the driving and driven members takes place and the mechanism is in direct drive. A sufficient quantity of fluid is provided in the mechanism to establish a level in the cover 39, as indicated by the dot and dash line 48, ducts 49 being provided for returning the fluid to the pump chamber.

The torque delivered to the driven member 20 may be considerably greater than the engine torque because the reaction from the nozzles or the unbalanced pressure against the flywheel adds to the engine torque thereby building up pressure in the pump above that which could be created by the engine alone.

While the invention has been described with specific reference to the accompanying drawings, it is not to be limited, save as defined in the appended claims.

I claim as my invention:

1. A driving member, a driven member, a fluid chamber formed on one of the members to rotate therewith, fluid flow creating means on the other member, stationary reaction means within the fluid chamber, a nozzle on the first member communicating with the flow creating means to direct the fluid flow against the reaction means, and means to vary the size of the nozzle to vary the torque transmitted between the driving and driven members.

2. A driving member, a driven member, a fluid pumping chamber on one of the members, a pump member carried by the other of the members, a fluid housing communicating with the chamber and rotatable therewith, stationary reaction means in the housing, a nozzle carried by the first member to direct fluid from the chamber against the reaction means, and means to change the size of the nozzle to vary the torque transmitted between the driving and driven members.

3. A driving member, a driven member, a fluid pumping chamber on one of the members, a pumping member on the other of the members, said pumping member being received in the chamber, a housing secured to the one of the members carrying the chamber and communicating therewith, stationary reaction means in the housing, and nozzles on the first member to direct fluid from the chamber against the reaction means.

4. A driving member, a driven member, a fluid pumping chamber on one of the members, a pumping member on the other of the members, said pumping member being received in the chamber, a housing mounted on the one of the members carrying the chamber and communicating therewith, stationary reaction means in the housing, nozzles on the first member to direct fluid from the chamber against the reaction means, and means to adjust the size of the nozzles.

5. A driving member, a driven member, a fluid pumping chamber on one of the members, a pump member carried by the other member, a fluid housing communicating with the chamber to rotate therewith, a stationary reaction member in the housing comprising an annular group of vanes, a nozzle carried by the first member, said nozzle adapted to describe a path within the vanes and to direct fluid against the vanes, and means to open or close the nozzle to vary the torque transmitted between the driving and driven members.

6. A driving member, a driven member, a fluid pumping chamber on one of the members, a pump member carried by the other member, a circular fluid housing communicating with the chamber and having an opening in the center thereof, a stationary reaction member having a supporting hub projecting through the opening of the housing, a nozzle carried by the first member to direct the fluid flow against the reaction member, and means to open or close the nozzle.

7. A driving member, a driven member, a fluid pumping chamber on one of the members, a pump member carried by the other of the members, a circular fluid housing communicating with the chamber and having an opening in the center thereof, a stationary reaction member having a supporting hub projecting through the opening of said housing, a nozzle carried by the first member to direct the fluid flow against the reaction member, a valve to open or close the nozzle, and control means extending through the opening of the housing to operate the nozzle.

AZOR D. ROBBINS.